United States Patent Office 3,696,032
Patented Oct. 3, 1972

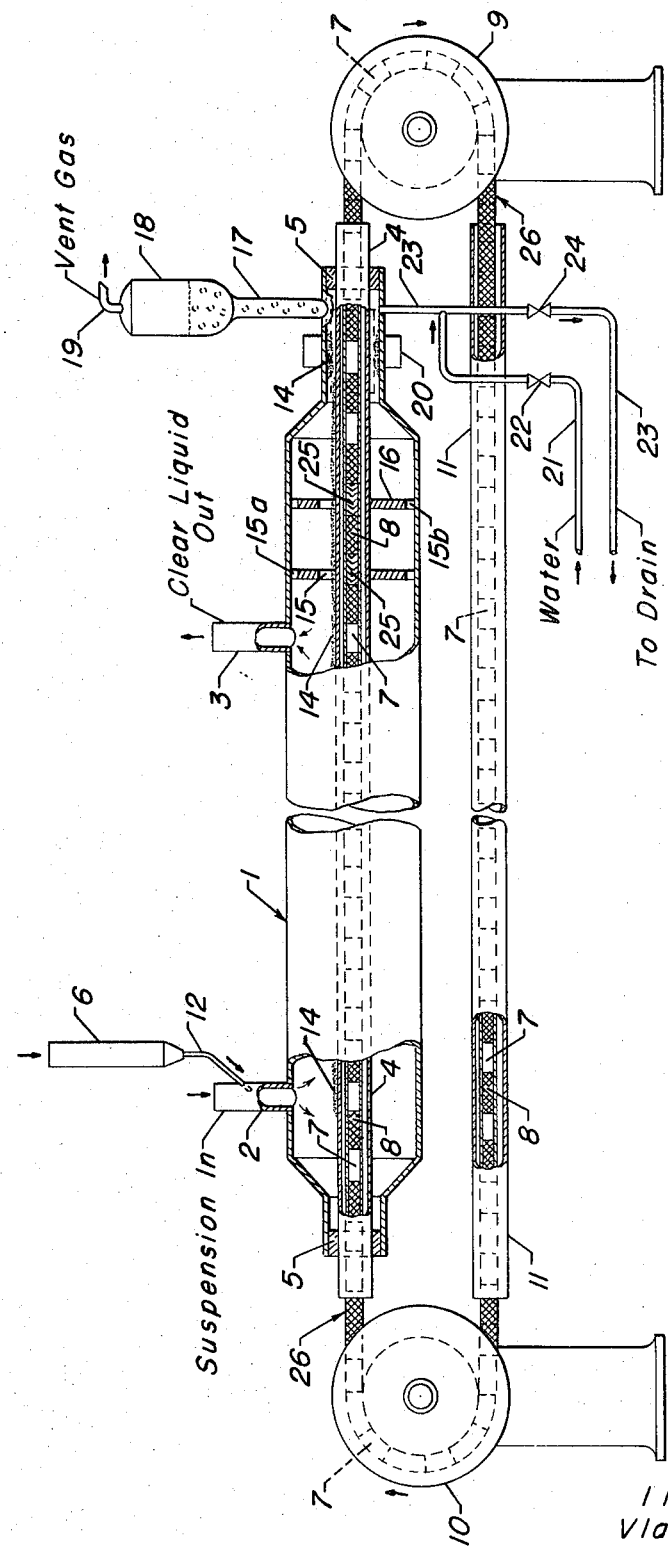

3,696,032
PROCESS FOR THE SEPARATION OF MAGNETIC PARTICLES FROM A FLUID STREAM
Vladimir Haensel, Hinsdale, Ill.
(30 Algonquin Road, Des Plaines, Ill. 62516)
Filed Nov. 9, 1970, Ser. No. 87,693
Int. Cl. B01d *17/06*
U.S. Cl. 210—42                          4 Claims

ABSTRACT OF THE DISCLOSURE

A process in which relatively large pre-magnetized iron particles are introduced into a fluid stream to scavenge smaller magnetic particles therefrom. The fluid stream is then passed through an annular space created by an open-ended conduit supported within a casing. A train of permanent magnets is moved through the conduit to attract the scavenged magnetic particles to the outer surface thereof, and the particles are swept along said surface by the traveling magnetic field to a particle collecting chamber.

---

This invention relates to a continuous process for the separation of magnetic particles from a fluid stream. More particularly, the present invention is directed to a process for the continuous removal of magnetic particles from an acidic alumina sol stream.

Many chemical manufacturing processes comprise reactant or effluent streams contaminated with small magnetic particles comprising iron and/or nickel which are susceptible to magnetic separation techniques. In particular, an acidic alumina sol effluent stream, formed by digesting aluminum metal in a hydrochloric acid system, will invariably be contaminated with magnetic particles, principally iron, derived from the aluminum metal. As a rule, the magnetic particles are susceptible to magnetic separation by treating the sol effluent stream by the technique of Boyd et al. described with reference to their magnetic particle collector in U.S. Pat. No. 3,428,179. Briefly, Boyd et al. described a particle collector for removing magnetic particles from a fluid stream comprising an outer casing and an inner non-magnetic open-ended conduit extending through the casing. A train of permanent magnets is moved through the conduit, and the fluid stream is passed through the annular space between the casing and the conduit. The particles are attracted to the outer surface of the conduit and are swept therealong by the traveling magnetic field to a particle collecting chamber which is periodically emptied of stored particles.

The efficient separation of the magnetic particles from an acidic alumina sol is of particular importance when the sol is subsequently converted to an alumina gel to serve as a base for a noble metal-containing hydrocarbon conversion catalyst, the latter being extremely sensitive to even minute quantities of said particles, particularly iron. While in some cases the magnetic particles are relatively large and readily susceptible to magnetic separation, in other cases the particles are quite small—colloidal in size—and magnetic separation becomes more difficult and less efficient, and the colloidal particles tend to remain in the sol stream.

It is therefore an object of this invention to present an improved process for the separation of magnetic particles from a fluid stream. It is a more specific object of this invention to present a novel process for the separation of colloidal sized magnetic particles from an acidic alumina sol stream. In one of its broad aspects, the present invention embodies a process for the continuous separation of magnetic particles from a fluid stream which comprises charging the fluid stream into a casing comprising speed inlet and outlet means and adapted to contain said stream, introducing premagnetized iron particles into the fluid stream and occluding magnetic particles thereon from said stream; passing said stream through an annular space created by an open-ended, non-magnetic conduit supported within said casing adjacent to said inlet and outlet means, both ends of said conduit extending through said casing to the exterior thereof; passing a magnetic train through said conduit, said train comprising a series of longitudinally arranged permanent magnets constructed and arranged to travel in unison therethrough; drawing the magnetic particles to the outer surface of said conduit by means of said magnets, and moving said particles along said surface by means of said magnetic train to a particle collection zone; and withdrawing said fluid stream from said casing through said outlet means substantially free of magnetic particles.

Other objects and embodiments of this invention will become apparent in the following detailed specification.

One preferred embodiment of the process of this invention relates to the separation of magnetic particles from an acidic alumina sol stream and the further description of the present invention is presented with reference thereto, and also with reference to the attached drawing representing an in-line magnetic particle collector substantially as described by Boyd et al. and modified to effect the process of this invention.

Thus, the attached drawing shows an in-line magnetic particle collector comprising an outer non-magnetic elongate casing 1 with a fluid inlet means 2 and a fluid outlet means 3. An inner non-magnetic open-ended conduit 4 is concentrically mounted within the casing and extends the full length thereof. Annular seal member 5, compressibly inserted into each end of the casing 1, serve as fluid-tight end closures for the casing and support the conduit therein. A particle reservoir 6 is provided adjacent to the fluid inlet means 2. The drawing further shows a train of uniformly spaced permanent magnets 7 supported within a flexible, non-magnetic, tubular braiding 8 and arranged to travel longitudinally through the conduit 4. An external housing 11 is provided to support the magnetic train as well as to protect the same from dirt, moisture, etc., on the return run. The magnetic train is engaged by a pair of pulley members, pulley 9 being motor driven and pulley 10 being an idler pulley.

In the present illustrative example of one preferred embodiment of this invention, the acidic alumina sol stream is a substantially pure alumina hydrosol prepared by digesting aluminum metal in aqueous hydrochloric acid. The aluminum metal starting material is about 99.9% pure aluminum in the form of pellets with iron being the principal impurity. The alumina hydrosol product stream contains said iron impurity suspended therein in the form of minute magnetic particles, mainly colloidal agglomerates having a size of the order of 1–100 microns. The alumina hydrosol product stream contains about 13.4 wt. percent aluminum, 11.8 wt. percent chloride, and has a specific gravity of about 1.404 at 25° C.

The acidic alumina sol stream is charged to the in-line particle collector through the fluid inlet means 2 and commingled with the pre-magnetized iron particles metered through line 12 from the particle reservoir 6. Pursuant to introduced into the fluid stream to create an internal the present process, the pre-magnetized iron particles are scavenging of small magnetic particles including those of colloidal dimension. The pre-magnetized particles are preferably relatively coarse pre-magnetized iron particles in excess of about 100 microns in size and capable of being suspended in the fluid stream. The iron particles introduced into the fluid stream are suitably only weakly magnetized and characterized by a field strength of less than about 5 gauss in the immediate vicinity thereof. Thus, the magnetized particles are of sufficient field strength to attract magnetic particles of colloidal dimension which occur in the immediate vicinity thereof, said colloidal particles being scavenged from the fluid stream in contact with the larger magnetized particles, and of a limited field strength to effect a minimum agglomeration thereof in the fluid stream.

With further reference to the drawing, the alumina sol, comprising a suspension of magnetized and magnetic particles, is passed through the annular particle separation zone and a clarified sol stream is withdrawn through the fluid outlet means 3. Concurrently therewith, the magnet train is driven through the conduit 4 preferably in the direction of the sol flow although preferably at a different rate. The magnetic train is suitably driven at a linear velocity corresponding to form about 0.1 to about 0.5 time the superficial liquid velocity of the sol—said velocity being the average velocity across the annular space between the casing 1 and the conduit 4.

The magnetized and magnetic particles accumulate as a thin layer 14 on the outside surface of the conduit 4 and are swept along said surface of the traveling magnetic field through opening 15 and orifice plates 16. Upon reaching the right end closure 5, further movement of the particles along the conduit surface is precluded and the particles accumulate in the relatively quiescent particle collection zone in the right hand portion of the casing 1 beyond plates 16. Any hydrogen which may be occluded by the particles and carried into the particle collection zone may be released through the upper vent holes 15a, eventually escaping through the fluid outlet means 3. In the event that hydrogen accumulation in the particle collection zone is substantial, there is provided a bleed pipe 17 leading to a hydrogen disengaging tank 18. Thus, the hydrogen bubbles upwardly from the collection zone through the bleed pipe to be collected in the disengaging tank and discharged to the atmosphere by way of line 19.

A holding magnet 20 is disposed exteriorly and in close proximity to the casing 1 of sufficient strength to overcome the traveling magnetic field and cause the particles to be drawn from the surface of the conduit 4 onto the casing wall. In order to reduce the hydrogen ion concentration in the particle collection zone, water may be introduced through a back flush line 21 and valve 22. The water back flows through the collection zone and openings 15 as well as through lower back flush holes 15b, into the separation zone and out through the fluid outlet means 3. The quantity of water required is small relative to the quantity of the sol being treated so as not to appreciably dilute the sol stream.

Particles which accumulate in the collection zone are periodically discharged by way of a drain line 23 and a control valve 24. The discharge process is effected by the inclusion of one or more non-magnetic spacers 25 in the magnetic train 26. When the spacers move into transverse alignment with line 23, the magnetic field in the region is greatly attenuated and the particles gain sufficient mobility whereby, with valve 22 temporarily closed and valve 24 briefly opened, the particles can be pressured through line 23 to a suitable drain.

I claim as my invention:

1. A process for the continuous separation of colloidal sized iron particles from an acidic alumina sol stream which comprises:
   (a) charging the alumina sol stream containing the colloidal iron particles to a casing comprising spaced inlet and outlet means and adapted to contain said stream, introducing to said stream pre-magnetized particles consisting essentially of iron and of larger size than said colloidal particles and occluding colloidal iron particles thereon from said stream;
   (b) passing said stream through an annular space created by an open-ended, non-magnetic conduit supported within said casing adjacent to said inlet and outlet means, both ends of said conduit extending through said casing to the exterior thereof;
   (c) passing a magnetic train through said conduit, said train comprising a series of longitudinally arranged permanent magnets constructed and arranged to travel in unison therethrough;
   (d) drawing the pre-magnetized iron particles and their occluded colloidal iron particles to the outer surface of said conduit by means of said magnets, and moving said particles along said surface by means of said magnetic train to a particle collection zone; and,
   (e) withdrawing said alumina sol stream from said casing through said outlet means substantially free of iron particles.

2. The process of claim 1 further characterized in that said acidic alumina sol stream is prepared by digesting aluminum metal in a hydrochloric acid system.

3. The process of claim 1 further characterized with respect to step (a) in that said pre-magnetized iron particles are in excess of about 100 microns in size.

4. The process of claim 1 further characterized with respect to step (a) in that said pre-magnetized iron particles are weakly magnetic and characterized by a field strength of less than about 5 gauss in the immediate vicinity thereof.

References Cited

UNITED STATES PATENTS

| 3,428,179 | 2/1969 | Boyd, Jr. et al. | 210—222 |
| 2,954,122 | 9/1960 | Colburn | 210—222 X |

REUBEN FRIEDMAN, Primary Examiner

T. A. GRANGER, Assistant Examiner